United States Patent [19]

Eagon

[11] 4,398,985
[45] Aug. 16, 1983

[54] RELEASABLE, SELF-DETACKIFYING LAMINATE CONSTRUCTION

[75] Inventor: Bevery M. Eagon, Tipp City, Ohio

[73] Assignee: Kimberly-Clark Corporation, Neenah, Wis.

[21] Appl. No.: 322,830

[22] Filed: Nov. 19, 1981

Related U.S. Application Data

[63] Continuation-in-part of Ser. No. 119,712, Feb. 8, 1980, abandoned.

[51] Int. Cl.³ .................. B32B 31/04; B32B 31/12
[52] U.S. Cl. ............................ 156/233; 156/241; 156/277; 156/247; 156/344; 428/212; 428/352; 428/914
[58] Field of Search ............ 156/289, 240, 239, 277, 156/344, 247, 233, 241; 428/40, 352, 518; 40/2 R

[56] References Cited

U.S. PATENT DOCUMENTS

| | | | |
|---|---|---|---|
| 3,383,121 | 5/1968 | Singer | 282/28 |
| 3,639,500 | 2/1972 | Muny et al. | 428/40 X |
| 3,690,909 | 9/1972 | Finley | 428/40 |
| 3,788,941 | 1/1974 | Kupits | 428/352 |
| 3,993,815 | 11/1976 | Douek et al. | 428/40 |
| 4,035,218 | 7/1977 | Yount | 156/289 |
| 4,161,557 | 7/1979 | Suzuki et al. | 428/40 X |

Primary Examiner—Alexander S. Thomas
Attorney, Agent, or Firm—Biebel, French & Nauman

[57] ABSTRACT

A laminated construction having differential release characteristics is provided which will yield a self-detackifying adhesive surface upon delamination. The laminate is produced by coating a film of a polymeric material onto one side of a face stock material and then laminating this construction to an adhesive which has been coated onto a release liner. The release liner is removed and the remaining portion of the laminate is affixed to a suitable substrate utilizing the exposed adhesive surface. The polymeric material is chosen so that upon delamination of the face stock from the substrate, it remains affixed to the adhesive coating. This results in a self-detackified adhesive surface on the substrate. The laminate construction is useful for tags, labels, stickers, and the like as well as for sending credit, business, or membership cards on preprinted mailers to ultimate users. Because of the unique self-detackifying surface produced, both the face stock and substrate can be used and further handled or processed by hand or automated equipment.

10 Claims, 4 Drawing Figures

RELEASABLE, SELF-DETACKIFYING LAMINATE CONSTRUCTION

This is a continuation-in-part of application Ser. No. 119,712 filed Feb. 8, 1980 now abandoned.

BACKGROUND OF THE INVENTION

This invention relates to a laminated construction having differential release characteristics, and more particularly to a laminated construction having a self-detackifying adhesive surface.

The use of multilayer, laminated paper or other foil stocks having a removable top lamina as tags, stickers, labels, and the like has become widespread in the art. One type of laminated construction presently used is produced by coating one side of a face stock with a release agent, such as a silicone based release agent. This coated stock is then laminated, release coated side down, to a paper base stock which has been coated on both sides with a pressure sensitive adhesive. The outer adhesive layer is protected by a silicone-coated paper release liner until the laminate is used.

By peeling off the release liner and affixing the outer adhesive layer to a suitable substrate, the laminated construction can serve a variety of purposes. Ultimately, the face stock can be delaminated from the rest of the construction by peeling it away from the adhesive layer on the base stock. The coating of the release agent on the face stock enables this separation.

However, problems have been encountered with this type of construction. Silicone-based release coating agents are difficult to apply to porous face materials to uniform thicknesses. This results in varying release characteristics and the splitting and transfer of a portion or all of the adhesive layer to the face stock when the face stock is attempted to be peeled away from the base stock. Additionally, it is difficult to print on silicone-based coating agents. Moreover, since both the face stock and the release liners of conventional laminate constructions are coated with the same release agent, difficulties are encountered in removing the release liner from the construction without prematurely delaminating the face stock.

Finally, once the face stock is peeled off of the prior art laminate, a tacky, pressure sensitive adhesive surface is exposed on the base stock, face stock, or both. This tackiness makes further processing of the face and/or base stocks by automated equipment next to impossible. Likewise, the problems associated with further processing by hand and ultimate disposal are enhanced by the tendency of the face and/or base stocks to stick to other documents, containers, and the like.

As can be seen, the need exists in the art for a laminated construction having controllable and predictable differential release capabilities. The need also exists for a laminated construction which does not result in the exposure and/or transfer of a tacky pressure sensitive adhesive layer when the face stock is peeled away from the base of the laminate.

SUMMARY OF THE INVENTION

The present invention meets that need by providing a self-detackifying adhesive laminated construction. The laminated construction of the present invention is produced by coating a film of a non-silicone containing polymer onto one side of a face stock and then laminating this construction to an adhesive which has been coated onto a release liner. The polymers should have differential release capabilities with respect to the face stock and adhesive, and preferably can accept printed indicia thereon by conventional printing techniques.

By differential release capabilities, it is meant that while the polymer film will initially adhere both to the face stock on one side thereof and the adhesive on the other side thereof, upon delamination of the construction, the polymer film will have a greater affinity for the adhesive layer. That is, when the face stock is peeled away, the polymer film will delaminate from the face stock and remain permanently affixed to the adhesive coating. It is also differential with regard to the respective adhesive forces between the face stock and the polymer on the one hand and the adhesive layer and the release liner on the other hand. That is, the release liner should be less strongly adhered to the adhesive layer than the polymer is to the face stock.

In use, the release liner protecting the adhesive is removed, the remaining portion of the preprinted laminated construction is affixed to a substrate by the exposed adhesive for use as a label, tag, sticker, business, membership, or credit card, or the like. When it is desired to remove the face stock from the remainder of the construction, such as for example the removal of a preprinted card from a larger substrate, the polymer will delaminate from the face stock and permanently remain on the adhesive coating.

This results in a substrate having a detackified adhesive surface (because only the polymer is exposed) which can be further used or processed either by hand or by automated equipment. Moreover, the removed face stock is free from adhesive and can also be used or further procesed. For example, a face stock can be preprinted as a business, membership, or credit card, affixed to a preprinted substrate, and sent to a customer. The customer can then remove the card by peeling it away from the remainder of laminated construction. The substrate surface now has a detackified surface which can be returned, by mail or otherwise, to the sender. The customer has a clean, nontacky card which can be placed in a wallet or purse and used as needed. Such uses would be impossible with prior art laminated structures since either the card, or the substrate, or both, would be covered with an exposed, tacky adhesive surface.

Accordingly, it is an object of the present invention to provide a laminated construction having a removable face stock which does not result in the exposure and/or transfer of a tacky adhesive layer when the face stock is peeled away from the base of the laminate. This and other objects and advantages of the invention will become apparent from the following description, the accompanying drawings, and the appended claims.

DESCRIPTION OF THE PREFERRED EMBODIMENTS

In accordance with the present invention and with reference to FIGS. 1a–d, the laminated construction is produced by first coating a film of a non-silicone containing polymeric material 14 onto one side of a face stock 10 to produce a first subassembly 100. The face stock 10 may be made from such diverse materials as paper; plastic films, sheets, and foils; textiles; glass; and metal foils and sheets. If paper or other porous material is used as the face stock material, then it is desirable to incorporate into or coat onto such paper or other material a release additive 12.

Figure 1A:
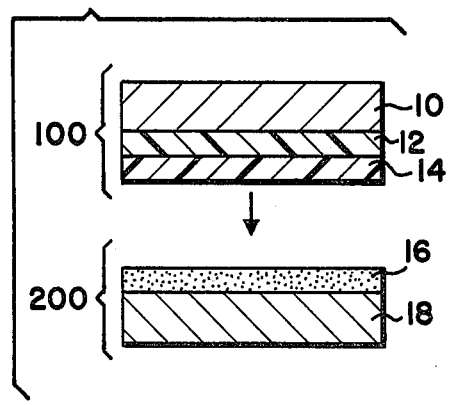
FIGS. 1a–d are cross-sectional views of the laminate construction of the present invention illustrating the various layers of the laminate during manufacture and use.
Figure 1B:
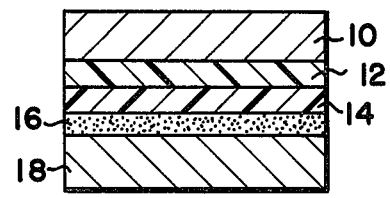
Figure 1C:
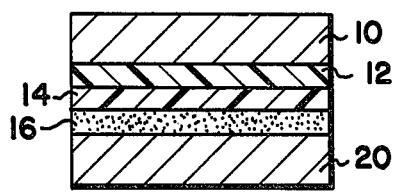

Preferably, this release additive 12 is also a polymeric material proferably a non-silicone containing material which can be either incorporated into the stock or coated onto it as shown in FIG. 1a. Many different polymeric materials may be utilized. The only limitation is that the polymer chosen must be able to release the face stock from the film of a second polymeric material which is interposed between the face stock and adhesive when a delaminating force is applied. That is, the combination of polymers chosen must adhere to the face stock and adhesive layer, respectively, better than they adhere to each other.

An example of such a release system which has found to be suitable in the practice of the present invention is polyethylene and polyvinylidene chloride. By coating a paper stock with a film of polyethylene and then overcoating that film with a film of polyvinylidene chloride prior to laminating the face stock with an adhesive, a release system is produced which will delaminate at the polyethylene-polyvinylidene chloride interface when the face stock is peeled away. Because the film of the second polymer, in this case polyvinylidene chloride, remains adhered to the adhesive layer, a detackified adhesive surface is produced when the face stock is peeled away.

Other examples of suitable release systems include polystyrene coated paper having a polyvinylbutyral film overcoated thereon, polyvinylchloride coated paper having a polyvinylalcohol film overcoated therein, polyester coated paper having a polyacrylate film overcoated thereon, and polyethylene coated paper having a film of a mixture of polyvinylidene chloride and polyvinylalcohol overcoated thereon. Preferably, one or both of the release additive and the polymer overcoating layer are capable of carrying printed indicia thereon by conventional printing techniques.

Of course, other release systems can be readily devised by one skilled in the art. The coating weights of the polymers utilized can vary over a wide range of from less than 1 lb/ream (3300 sq. ft.) to 15 or more lb/ream (3300 sq. ft). The lower end of the range is determined by the ability to achieve a continuous, uniform coating at a low coating weight while the upper end of the range is principally determined by material costs. If a non-porous face stock is utilized, then coating its surface with a first polymeric material may be eliminated. But as in the case of a coated paper face stock, the face stock must be less adherent to the polymer than the polymer is to the adhesive layer.

The adhesive 16 used in the present invention can be any pressure sensitive type adhesive, a heat activated adhesive, a water remoistenable adhesive, or a thermosetting type adhesive. Preferably, solution, water based or hot melt pressure sensitive type adhesives are utilized because of their ease of handling and application. Examples of pressure sensitive adhesives useful in the practice of the present invention include styrene-isoprene block copolymers, acrylic ester-vinyl acetate copolymers, ethylene-vinyl acetate copolymers, suitably plasticized vinyl acetate homopolymers, rubber-latex resin emulsion systems, and acrylic copolymers which are composed of the various acrylate ester monomers known to produced pressure sensitive adhesives.

The solids content of the adhesives when coated may vary from about 35 to 100%. The viscosity of the adhesives may be adjusted by temperature variation or by suitable solvents, thinning with water or using compatible thickeners to give the optimum flow properties for smooth, uniform coatings. Preferably, the adhesive 16 is coated onto a release liner 18 to form a second subassembly 200 and the laminated to the polymer bearing side of the face stock sub-assembly 100. However, it is possible to coat the adhesive directly onto the polymer bearing side of the face stock assembly and then apply the protective release liner over it. The adhesive is generally applied to give a resultant coat weight of between 10 and 35 lb/ream (3300 sq.ft.).

The protective release liner 18 can be selected from a number of known and available papers having a release material coated onto one side of the paper web. The base paper of the release liner may be selected from krafts, super-calendered krafts, clay coated krafts, glassines, parchments, and other papers and films which have a suitable undercoating for release coating holdout. The release coating may be any of the known materials used for their release properties for adhesives. Preferred types are silicones and modified silicones, the modification including both copolymerization of silicones with other nonrelease chemical agents or by adding nonsilicone materials to the silicone coating solution prior to application to the release base paper. Other release agents such as polyethylene, fluorocarbons, the Werner-type chromium complexes, and polyvinyl octadecyl carbamate may also be used. The choice of release coating is dependent on the tack, adhesion level, and chemical nature of the adhesive.

The only requirement of the release liner 18 is that it be released from the adhesive layer 16 by a force much less than the force required to delaminate the face stock 10-12 from the polymer layer 14. This requirement is necessary to avoid premature delamination of the face stock when the protective release liner is peeled away. It has been found that a laminate construction having suitable release characteristics will be produced if the force required to delaminate the face stock from the polymer layer is at least 80 grams greater than the force required to peel off the release liner as measured by a Standard Tag and Label Manufacturer's Insititute (TLMI) release and adhesion tester using a 2 inch width laminate and a 180° peel angle.

The present invention has the advantage that the face stock may be preprinted on one or both sides prior to lamination, or the outside face of the stock can be printed even after lamination to a substrate. Moreover, the substrate may be preprinted,including the area to be covered by the laminated construction, and that area will become visible and readable after removal of the face stock as long as a transparent or translucent polymer and adhesive are used.

Figure 1D:
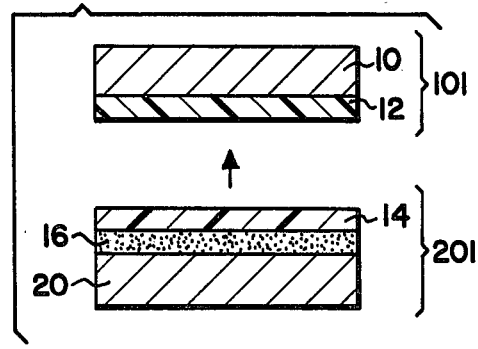

The unique chemical divergence of the differential release system of the present invention (e.g., a face stock coated with a first polymer release agent and a second polymer layer interposed between the face stock and adhesive) permits easy and accurate control of the delaminating properties of the structure as opposed to prior art silicone-based release systems. However, a significant major advantage of the present invention is that upon removal of the face stock as shown in FIG. 1d, the adhesive layer 16 affixed to substrate 20 is permanently detackified. Thus, both the face stock sub-assembly 101 and substrate sub-assembly 201 can be further used or processed either by hand or by automated equipment.

The following nonlimiting examples are provided to illustrate a method of making the laminated construction of the present invention.

EXAMPLE 1

An 8 point (110 lb/ream 3300 sq. ft.) tag face stock from the Union Camp Corporation was coated on one side with low density polyethene by an extrusion process known in the art. A coat weight of 5 lb polyethylene per 3300 sq. ft. ream was used. Next, a coating of polyvinylidene chloride having the following composition (all percentages by weight) was coated onto the polyethylene-coated side of the face stock from a water dispersed system.

| | |
|---|---|
| Polyvinylidene chloride latex, Geon 652 from B. F. Goodrich Company | 46.0% |
| Wetting agent, Triton GR-7M, from Rohm and Haas Company | 1.7% |
| Thickening agent, Acrysol GS, from Ultra Adhesives, Inc. | 0.3% |
| Defoamer, Dee Foo 97-2, from Ultra Adhesives, Inc. | 0.1% |
| balance water | 51.9% |

The viscosity of the coating was approximately 1400 cps, and it was applied at a coating weight of 5 lb/3300 sq. ft. ream. The coating was applied by a wire wound rod directly to the low density polyethylene coating on a production coater using a #10 Mayor Rod and drying in an air circulating oven for 1–2 minutes at 175° F. The coated stock was then wound on itself into a roll.

A pressure sensitive adhesive comprising a styrene-isoprene block cololymer, a terpene tackifying resin, hydrocarbon process oil, and an antioxidant was extrusion coated from a hot melt system onto a silicone coated release liner at a coating weight of 12.5–14.5 lb/3300 sq. ft. ream. The adhesive coated release liner was then laminated to the polyvinylidene chloride side of the face stock. The roll was then trimmed and slit into smaller rolls. Alternatively, if desired, the laminate could be cut into sheets.

Release values were determined using a TLMI release and adhesion tester. The silicone-coated release liner had a release valve of 10–20 grams/2 inch width when peeled from the adhesive layer at an angle of 180° at 300 inches per minute. After removal of the silicone-coated release liner, the adhesive coated stock was laminated to a substrate. The release value of the polyvinylidene chloride coating from the face stock was 100–120 grams/2 inch width when peeled at an angle of 180° at 300 inches per minute. The polyvinylidene chloride coating adhered to the adhesive coating resulting in a permanently detackified surface.

EXAMPLE 2

An 8 point (110 lb/ream 3300 sq. ft.) tag face stock from the Union Camp Corporation was coated on one side with low density polyethylene by an extrusion process known in the art. A coat weight of 5 lb. polyethylene per 3300 sq.ft. ream was used. Next, a coating of a mixture of polyvinylidene chloride and polyvinyl alcohol having the following composition (all percentages by weight) was applied by a rod coating process onto the polyethylene-coated side of the face stock from a water dispersed system.

| | |
|---|---|
| Polyvinylidene chloride, Dow Saran 159 at 53% solids | 49.0% |
| Wetting agent, Triton X-100, from Rohm and Haas Company | 0.3% |
| Polyvinyl alcohol 20-90, from | 0.3% |
| Defoamer, Dee Fo 97-2, from Ultra Adhesives, Inc. | 0.1% |
| Balance water | 50.3% |

The coating was applied at a coating weight of approximately 416/3300 sq.ft. ream. After drying, the coated stock was then laminated using a rubber-based pressure sensitive adhesive to a conventional silicone-coated release liner.

While the products and methods described herein constitute preferred embodiments of the invention, it is to be understood that the invention is not limited to these precise products and methods, and that changes may be made therein without departing from the scope of the invention which is defined in the appended claims.

What is claimed is:

1. A method of preparing a self-detackifying laminate construction comprising the steps of:
    coating of least one surface of a face stock sheet with a layer of a nonsilicone containing release polymer,
    applying to the coated face stock sheet a release additive in the form of a film of a nonsilicone containing polymer to form a subassembly,
    coating a substrate with a layer of adhesive, and
    laminating the adhesive-coated surface of said substrate to the release additive-coated surface of said subassembly to form a laminate, said release additive being releasable from said coated face stock sheet upon the application of a delaminating force less than the force required to separate said release additive from said adhesive or said adhesive from said substrate.

2. The method of claim 1 including the step of printing on one or both sides of said coated face stock sheet.

3. The method of claim 1 in which said face stock sheet is selected from the group consisting of paper, polymer films, polymeric sheets, textiles, glass, metal foils and metal sheets.

4. The method of claim 1 which said nonsilicone containing release polymer is polyethylene and said nonsilicone containing polymer is polyvinylidene chloride.

5. The method of claim 1 in which said nonsilicone containing release polymer is polystyrene and said nonsilicone containing polymer is polyvinylbutyral.

6. The method of claim 1 in which said nonsilicone containing release polymer is polyvinyl chloride and said nonsilicone containing polymer is polyvinyl alcohol.

7. The method of claim 1 in which said nonsilicone containing release polymer is a polyester and in which said nonsilicone containing polymer is a polymer of acrylic acid.

8. The method of claim 1 in which said nonsilicone containing release polymer is polyethylene and said nonsilicone containing polymer is a mixture of polyvinylidene chloride and polyvinyl alcohol.

9. A method of preparing a label, tag, or business, membership, or credit card comprising the steps of:

coating at least one surface of said label, tag, or business, membership, or credit card with a layer of a nonsilicone containing release polymer, applying to the coated label, tag, or business membership, or credit card a release additive in the form of a film of a nonsilicone containing polymer to form a subassembly, coating a substrate with a layer of adhesive, laminating the adhesive-coated surface of said substrate to the release additive-coated surface of said subassembly to form a laminate, printing on the exposed face of said subassembly, and delaminating the printed and coated label, tag, or business, membership, or credit card from said laminate at the interface between said coated label, tag, or business, membership, or credit card and said film of release additive to provide a detackified tag, label, or business, membership, or credit card.

10. The method of claim 9 including the step of printing on said substrate prior to the application of said layer of adhesive.

* * * * *